(12) United States Patent
Jones et al.

(10) Patent No.: US 6,442,457 B1
(45) Date of Patent: Aug. 27, 2002

(54) METHOD AND APPARATUS FOR THERMAL TESTING OF BRAKE PERFORMANCE

(75) Inventors: Barbara L. Jones; Stephen J. Davis, both of Norfolk (GB)

(73) Assignee: Snap-on Equipment Limited, Norfolk (GB)

( * ) Notice: Subject to any disclaimer, the term of this patent is extended or adjusted under 35 U.S.C. 154(b) by 0 days.

(21) Appl. No.: 09/463,031

(22) PCT Filed: Jul. 20, 1998

(86) PCT No.: PCT/GB98/01949

§ 371 (c)(1),
(2), (4) Date: Jan. 8, 2000

(87) PCT Pub. No.: WO99/04236

PCT Pub. Date: Jan. 28, 1999

(30) Foreign Application Priority Data

Jul. 19, 1997 (GB) .............................. 9715147

(51) Int. Cl.⁷ .............................................. G01M 17/00
(52) U.S. Cl. ........................................ 701/29; 701/33
(58) Field of Search ............................ 701/29, 31, 33, 701/35; 73/121, 129

(56) References Cited

U.S. PATENT DOCUMENTS

| | | | |
|---|---|---|---|
| 3,995,475 A | * | 12/1976 | Cline |
| 4,591,213 A | * | 5/1986 | Rapoport |
| 4,674,326 A | * | 6/1987 | Reinecke |
| 5,109,343 A | * | 4/1992 | Budway |
| 5,189,391 A | * | 2/1993 | Petersen et al. |
| 5,396,422 A | | 3/1995 | Forchert et al. |

FOREIGN PATENT DOCUMENTS

| | | |
|---|---|---|
| EP | 0 685 723 A2 | 10/1995 |
| EP | 0729 018 | * 8/1996 |
| WO | WO 84/00406 | 2/1984 |

OTHER PUBLICATIONS

WPI Abstracts of UK—EP 685723, date 19951206.
WPI Abstracts of UK—FR 2624979, date 19890623.
Patent Abstracts of Japan—63203935, published Aug. 23, 1988.
Patent Abstracts of Japan—63247628, published Oct. 14, 1988.
WPI Abstracts of UK—ZA8400052, date 19840709.

* cited by examiner

*Primary Examiner*—Richard M. Camby
(74) *Attorney, Agent, or Firm*—Seyfarth Shaw

(57) ABSTRACT

Vehicle thermal testing method and apparatus is based upon the use of a mobile handset. The handset uses spot infra red thermal sensing to identify thermal imbalance between wheels on opposite sides or the same side of a vehicle. Testing identifies thermal levels resulting from braking by mere application of the handset to wheel nuts after a short brake application and without use of roller test beds or other such equipment. Tires can be similarly tested. The handset can generate test instructions. Repetition of an initial test enables the offset for cooling during the test to be verified. A similar technique applies to tires. The handset may communicate with a base station providing for keyboard input of vehicle data and results printout.

18 Claims, 3 Drawing Sheets

METHOD AND APPARATUS FOR THERMAL TESTING OF BRAKE PERFORMANCE

This invention relates to a vehicle thermal testing method and apparatus and is an improvement in or modification of the brake testing method and apparatus disclosed in our prior-published specification EP-A-0 729 018 (our reference P52580EP). The present invention is principally applicable to thermal testing of automotive wheel assemblies including brakes and wheels and tires and rim assemblies for identifying thermal imbalance arising particularly from braking imbalance, but which is also applicable to identifying tire temperature imbalance and other factors such as wheel bearing temperature imbalance. Indeed, the present invention provides a method and apparatus which is so quick and convenient to use that it is applicable to any vehicle including railway vehicles and aircraft where testing of nominally thermally balanced locations for (potentially) minor temperature differences may reveal (the beginnings or symptoms of) important differences in settings or conditions or load. The invention is also applicable to the testing of vehicle systems which, in use, are thermally stable but operate at (determinable) different temperatures, and such use of the invention may extend to vehicle engine and transmission systems and of course to braking systems other than friction braking systems, including electrical brakes. A particular application of the invention is to aircraft braking systems and to monitoring the operation of same, particularly in high stress situations such as after a rejected take-off where the thermal load in the system leads to very high temperatures. Equally, the invention is applicable to the detection of brakes or other systems which are not generating sufficient (or any) heat.

The invention provides a means for quickly and conveniently assessing a thermal distribution system for imbalance or other irregularity detection. The system offers a simple means to identify the seat of a potential or developing problem.

The specification of our prior EP application discloses a method and apparatus for analysis of brakes in automotive vehicles. Spot-type infra-red thermometers are employed to sense localised temperature elevation produced by brake application, sensing at spot zones located on, for example, wheel nuts/studs which provide a thermal transfer route from the brake drums or discs. Analysis of the thermal data from the sensors includes a peak detect-and-hold function. Comparison of the thermal data enables detection of braking imbalance.

The brake testing system of our prior EP specification has proved to be of significant practical applicability for the routine testing of automotive braking systems, particularly in view of the relative simplicity of the equipment involved and the scope provided for relatively accurate determination of braking imbalance. Thus, the system does not require the use of roller systems and associated kinetic energy measurement systems. The equipment involved in the system of our prior EP specification is largely based upon off-the-shelf infrared spot sensor devices which are used in combination with software-intensive data processing systems of the kind which can be provided for a dedicated function of this kind at increasingly satisfactory low initial costs as original equipment.

In summary, the system of our prior EP specification offers the prospect for simple roadside testing of vehicle braking operations utilising lightweight mobile equipment leading to immediate meaningful results, and without the complications or expense inherent in prior systems.

Nevertheless, the system disclosed in our prior EP specification is itself susceptible of improvement, notably in relation to the facilities provided for the physical implementation of the test routines, notably the measures provided for ensuring proper and convenient and rapid and effective inputting of thermal data, including alignment of the sensor device with the relevant portion of each wheel to be tested. Also, there is a need for the provision of a system whereby the sequential tests to be carried out on one or more wheels of a vehicle are carried out in the appropriate and proper sequence so that data is properly compared between wheels on the same or opposite sides of the vehicle according to the requirements of the test in question.

Clearly, if possible such a system should be implemented in a very simple and/or practical and/or rapid manner utilising lightweight and/or easily operated and/or cost-effective equipment which somehow minimises the opportunities for the introduction of operational errors by the technical personnel carrying out the tests.

An object of the present invention is to provide a method and apparatus providing improvements in relation to one or more of the matters discussed above, or generally.

According to the invention there is provided a method and apparatus applicable to the thermal analysis of vehicle wheels and other heat generating assemblies including brake and tire performance in automotive and other vehicles, as defined in the accompanying claims.

In an embodiment of the invention described below there is provided a method and apparatus for analysis of brake performance in automotive vehicles in which data is inputted to the sensing means and/or to a test control system associated therewith, relating to vehicle type or wheel or brake characteristics, and a mobile testing handset of said sensor means is caused to generate testing instructions in accordance with the method to be carried out for a given vehicle type or wheel or brake characteristics under test. Moreover, the testing steps carried out in accordance with the instructions displayed by the handset, such steps relating to at least one axle of the vehicle, are carried out in a sequence defined and in accordance with the instructions and this sequence includes a repetition of at least one step of the sequence so that allowance made for the effect of the time taken to carry out the sequence of steps can be checked and adjusted if necessary.

Accordingly, it can be seen that in this way, by the provision of a mobile handset, there is provided a simple means in which the practical and manual implementation of the thermal testing system is greatly facilitated. The use of a manual handset having (if desired or necessary) an appropriate communications link to a base station is in itself a practical step forward which enables the technical operative carrying out the test more easily and rapidly to manipulate the equipment.

In addition, the handset enables easy positioning of the infrared spot sensor in a defined location in relation to a vehicle wheel. For example, a simple location-and-distance-defining locater device can be utilised to define a fixed distance with respect to wheel nuts so that all that the operative needs to do is to place the locater device over a wheel nut of the relevant wheel of the vehicle and the sensing distance and sensing attitude are thereby effectively and accurately defined. One important source of test error is thereby reduced or eliminated. In such a system the infrared spot sensor can be of the fixed focus kind which greatly simplifies its construction and reduces it cost. Alteratively, a non-mechanical locator device such as a laser spot pointer can be used to ensure accurate alignment, and in such a system the infrared spot sensor needs to have adjustable focus functionality to provide validity in the thermal comparison step in the method of the invention.

As to the sequence of steps which needs to be carried out, in accordance with the described embodiment the handset itself is caused to display the necessary instructions for the proper sequence of test operations. For example, the handset may be provided with a display device representing one or more aspects of the construction of the vehicle is wheels or braking system together with the provision of light-emitting-diodes at opposite ends of a simulated axle so that light pulses generated by the LED's can directly and accurately instruct the user which wheel to carry out the next test at. Also, the arrangement can be such that the LEDs signal the required duration of a given test and likewise indicate when the handset can be removed from the particular wheel nut or other structure on the wheel. In the case when the method is to be used to compare the wheels of (say) two stub axles at opposite sides of the vehicle, then the "instructions" may amount to no more than an indication of when the first test (on one wheel) is complete and likewise for the second test. It will be understood that in the case of a simple system intended only (or mainly) to check braking balance between two wheels on opposite sides (or the same side) of the vehicle, then the extent of instructions needed for this purpose is correspondingly limited provided the user applies the handset to the wheel nuts for a sufficient period to enable the temperature to be clearly sensed, and provided also that the time interval between the test on one wheel and the next test is reasonably short.

By arranging the test sequence so that at least one step in the sequence is repeated, allowance can readily be made (by Newton's law of cooling) for the effect of the time taken to carry out the sequence of steps, and this allowance can be checked and adjusted if necessary. The system checks for ambient temperature and allows for this accordingly. Thus, another variable which inevitably would otherwise introduce inconsistency between different operatives carrying out the test, or indeed between successive tests carried out by one operative, is thereby largely reduced or eliminated. In the case where an operative is required to carry out the test at a defined speed (in a fixed time) and/or where the effect of heat losses can be ignored (high ambient temperature or rapidly-executed tests) it may be acceptable not to repeat one of the tests while still obtaining an acceptably accurate result.

Thus, the described embodiment provides a practical and readily utilised system for automotive brake imbalance testing in which the variables arising from matters discussed above are either reduced, eliminated or rendered controllable so as to enable the method and apparatus to produce results which are statistically greatly improved.

In the embodiment described below, the algorithm employed in the thermal comparison function is constructed such that the side-to-side (or same side) imbalance calculations produce results indicating pass or check or fail levels of 0.15% imbalance, 16 to 30% imbalance, and above 30% imbalance respectively. These figures are designed to correlate with the percentage imbalances achieved using brake force measured on standard roller-type brake testers.

An embodiment of the invention will now be described by way of example with reference to the accompanying drawings in which.

We hereby incorporate the entire disclosure of our above-mentioned prior specification EP-A-0 729 018 into the present application as part of the technical disclosure herein.

Figure 1:
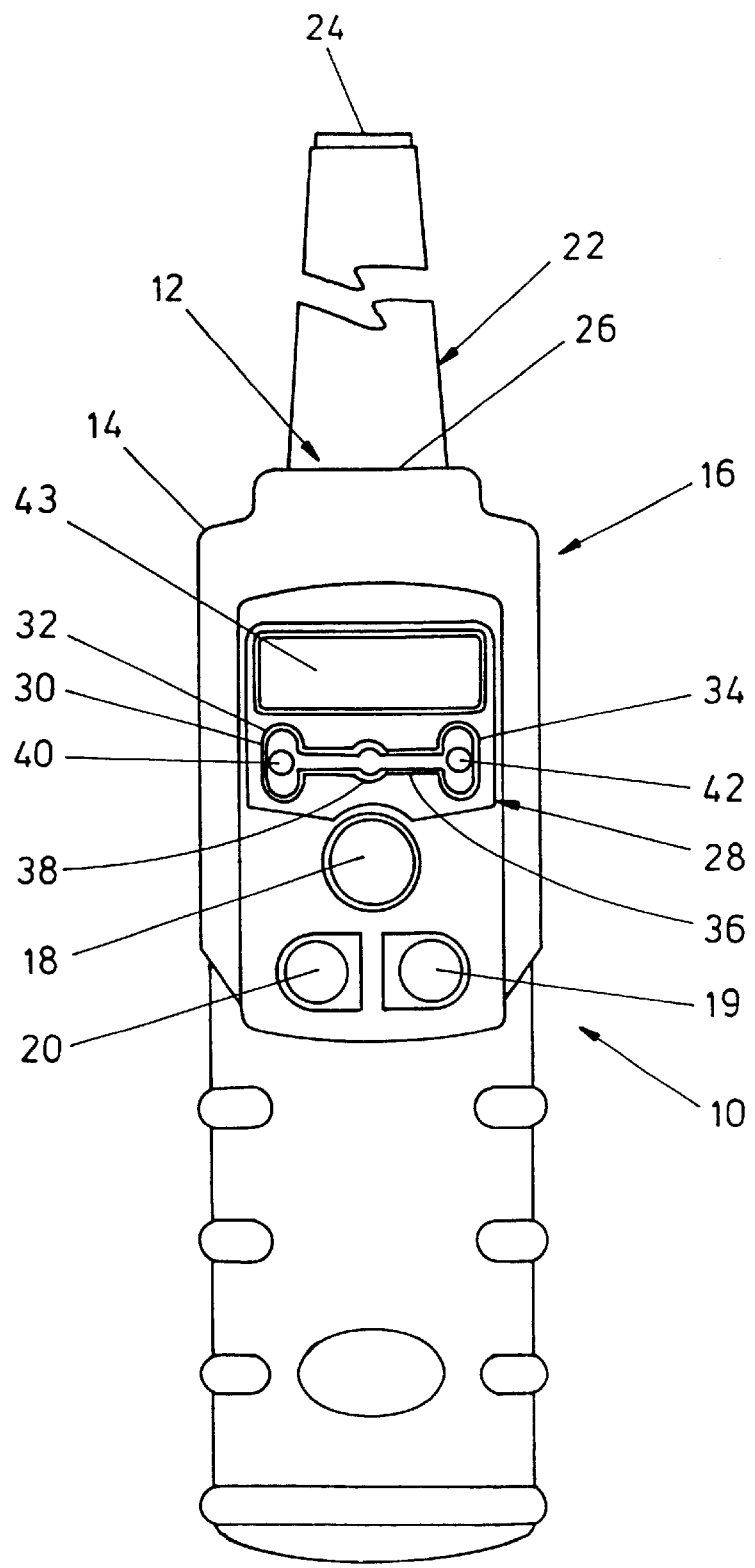
FIG. 1 shows a representation in plan view of a handset having an associated locator device, for use in accordance with the method of the invention.

As shown in FIG. 1, apparatus 10 for analysis of brake performance in automotive vehicles comprises sensing means 12 including infra-red spot sensor means adapted to sense the temperature of a location on a brake drum or structure connected thereto.

In this embodiment, sensing means 12 is incorporated within a handset 14 and corresponds to sensor 14 in FIG. 4 of EP '018 mentioned above.

Figure 2:
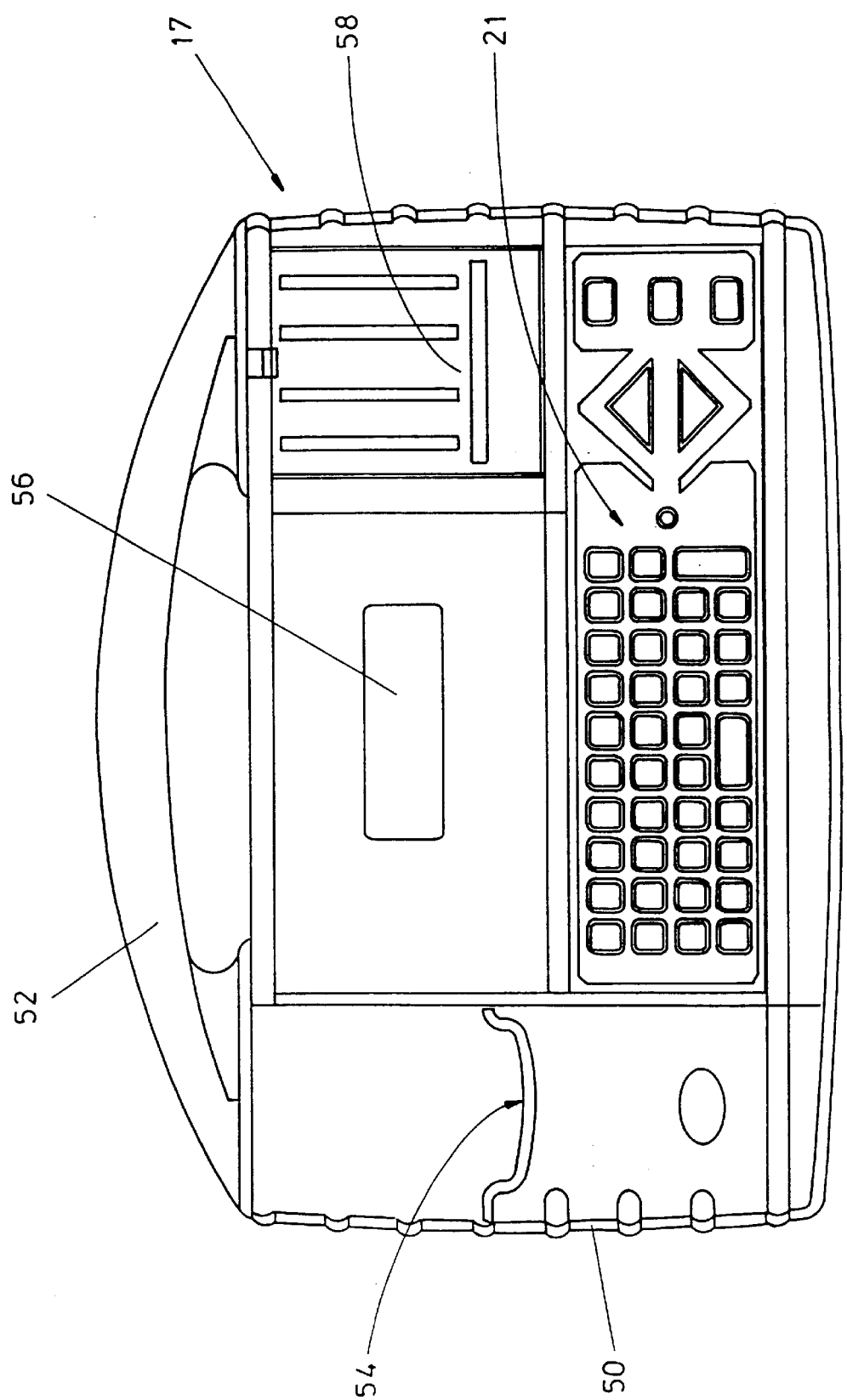
FIG. 2 shows an elevation view of a base station, shown on a slightly smaller scale than the handset of FIG. 1, for use in association with the handset of FIG. 1.
Figure 3:
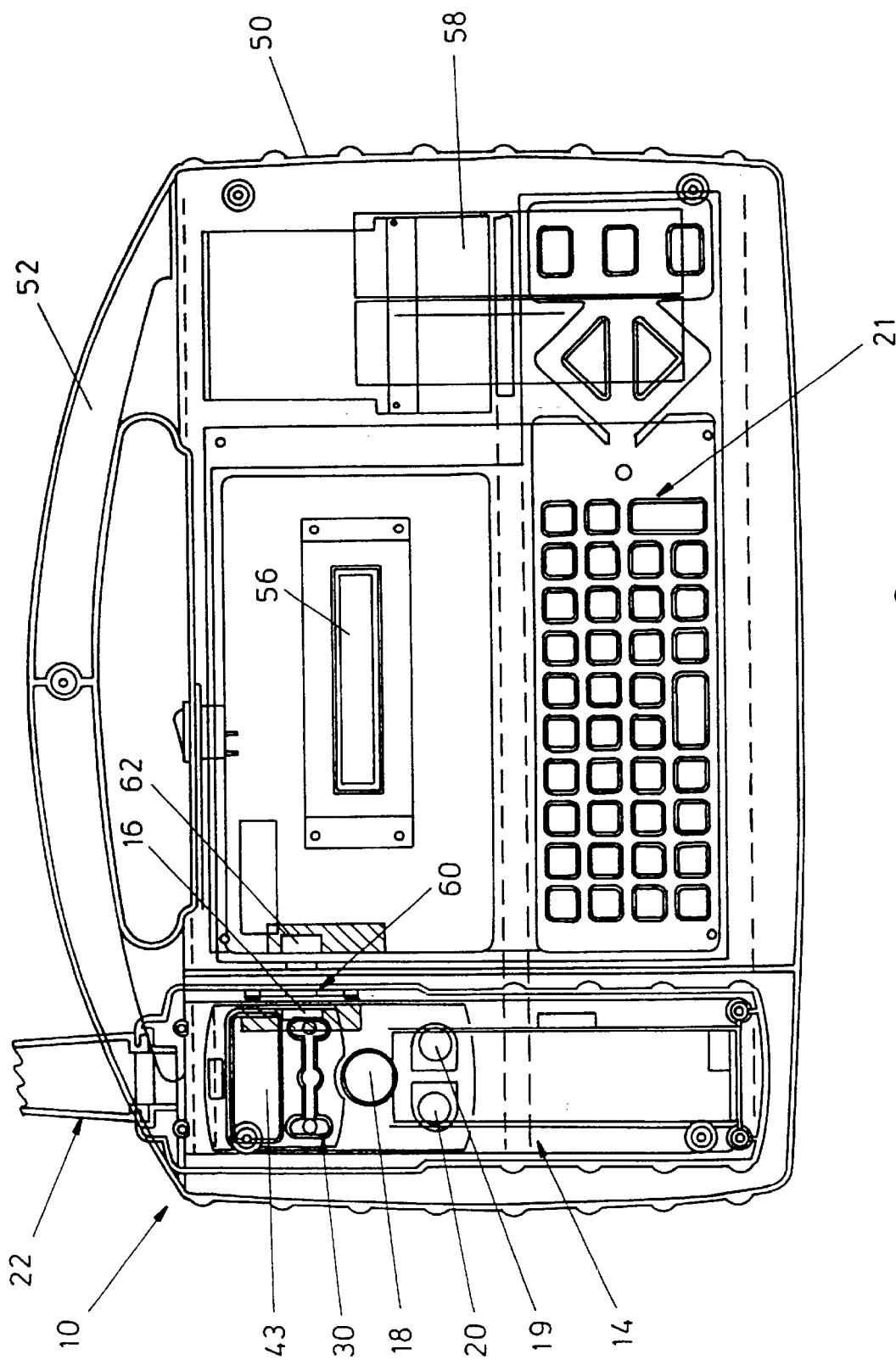
FIG. 3 shows the base station and handset of FIGS. 2 and 1 shown with the latter located in a holster which acts as a cradle for the handset, in which position it can communicate with the base station by an infrared link.

Handset 14 is powered by a battery (not shown) and incorporates a wireless communications link located at 16 (constituted by an infrared communications link) to a base station 17 (see FIGS. 2 and 3) incorporating the major components of the apparatus shown in FIG. 4 of EP '018 mentioned above. The base station includes processor and memory functions adapted to compare data obtained by handset 14 during two or more sensing steps (for example at two wheels on opposite sides of the vehicle, or on the same side thereof) to determine the degree of braking imbalance in a given vehicle. Such "imbalance" may reveal, of course, that one or more brakes is insufficiently applied to generate any significant braking heat at all. Equally, one or more brakes may be over-applied. One particularly useful application of the invention is to detect modest differences between very high braking temperatures after substantial use of a braking system, such differences revealing a degree of braking imbalance.

Handset 14 further comprises control buttons 18, 19, 20 to enable the manual control of the handset during test operations, as will be more fully described below. Information relating to vehicle type and/or wheel and/or brake characteristics for a given test which is about to be undertaken may be inputted to the system by means of an alpha-numeric keyboard 21 on base station 17.

In this embodiment, test data is received and temporarily stored within handset 14 for subsequent communication to base station 17 and data-processing within the base station. In a modification, the data processing is performed within the handset itself.

In this embodiment, the system operates to generate testing instructions in accordance with the method to be carried out for a given vehicle type or wheel or brake characteristics under test.

The test control system incorporated in software provided within handset 14 or within the processor and memory function described in EP '018 FIG. 4, generates testing instructions relating to testing steps carried out on at least two wheels of a vehicle under test by means of the handset and in accordance with instructions displayed by the handset, so that test data can be generated relating to brake performance. Of course, in the case of double wheel assemblies (for example the driven wheels of an articulated vehicle tractor portion) the tests will normally be carried out on the basis of testing the outer (and accessible) wheel of the dual wheel assembly (by application of the handset to one of its wheel nuts), and then the subsequent test may be on the corresponding wheel on the opposite side of the vehicle or another wheel on the same side of the vehicle. Where dual wheels are mounted on a common stub-axle at one side of the vehicle (or indeed in pairs at opposite ends of a common beam axle), the fact that such wheel pairs each have their own brake assembly means that it is unnecessary to test the individual wheels of a given pair, though, of course, a test may be performed (and frequently is) on the pairs of wheels at opposite sides of the vehicle (which may be mounted on individual stub axles or on a common beam axle) in order to distinguish any imbalance in their braking or other characteristics.

As shown in FIG. 1, handset 14 is provided with a forward-mounted location-and-distance-defining locater device 22 in the form of a generally frusto-conical nose cone on the handset and having an open forward end 24 which, in use, is received over a vehicle wheel nut, and having also an open inward end 26 mounted directly on the forward end of handset 14. Both these ends are of circular cross-sectional shape and serve to confine infra-red signals transmitted between the wheel nut (or other structure) and the sensor itself, for test purposes. The locator or spacer device 22 likewise serves as a simple practical means for ensuring that all tests are carried out at a standard distance from a given wheel nut. Variations in axial projection of wheel nuts between vehicles matter not since for a given test this factor will be constant.

Handset 14 further comprises a display device 28 incorporating a device 30 representing the general structure of a vehicle axle, and indicated diagrammatically as consisting of wheels 32, 34 linked by an axle structure 36 incorporating the central bulk of a differential housing 38.

Within the generally rectangular representations of wheels 32, 34 there are incorporated likewise rectangular Light Emitting Diodes (LED) devices 40, 42 which in use emit light pulses of varying duration and/or colour.

Also forming part of display device 28 is a liquid crystal display screen 43 providing information concerning test steps proceeding and/or test steps to be carried out.

It can now be seen that in this embodiment of the invention handset 14 corresponds to sensor 14 in FIG. 4 of EP '018 and may incorporate certain other data processing functions of the remainder of the apparatus shown in FIG. 4, but this is a matter of design convenience for any given specific application of the invention. In the embodiment alignment and spacing of the sensor from the relevant structure on a wheel under test (for example a wheel nut) is determined by locator or spacer device 22.

The handset's three-button key pad comprising control buttons 18, 19 and 20 provide the functions of general control (for all functions), power on/off, and test-repeat control respectively. These, in combination with the liquid crystal display 43 and the axle device 30 enable the user to control the test operations and to receive instructions for same. The light-emitting diodes complement the instructions on the screen 43 by flashing to demonstrate which side of the vehicle is being tested, and then by flashing at a high rate to indicate that the temperature measurement is being taken.

Locator device 22 has a heat-resistive and toughened material at its outer end which prevents damage to the handset housing for example when testing aircraft wheel nuts and other high temperature applications.

In use, the operator merely presses the function button 18 to commence a test, when prompted by the display on the screen 43.

Turning now to the structure of base station 17, this comprises a mobile unit having a main body 50 with a carrying handle 52, and a holster 54 to receive handset 14. Keyboard 21 provides control functions in association with a liquid crystal display screen 56 and a thermal printer 58 provides a printed record of test data. The unit is battery-operated with a recharge facility.

An important aspect of the operation of base station 17 is the wireless infrared communications link 60 provided between the infrared transmit/receive function 16 of handset 14 and the corresponding unit 62 provided on the base station.

In use, an operative initially inputs to the system via keyboard 21 data identifying the vehicle type in question, whereby the system obtains from its memory function data relating to the vehicle type, whereby the system is informed of the number of axles which require to be tested, or is informed of other characteristics relating to the braking system of the vehicle, enabling it to generate a sequence of test instructions. The software system may be arranged to prompt the user to provide identification of the vehicle by its registration number, the name of the user, and other information. All relevant data is transmitted to handset 14 in preparation for the commencement of the mobile tests.

Then, handset 14 is removed from cradle 54 and display device 28 is energised and LED devices 40, 42 (one or other of them) is energised in order to indicate by appropriate colours and duration of light pulses emitted (in accordance with system operating instructions), which wheel (which may be the outer wheel of a double wheel assembly on a stub or beam axle) on the vehicle to commence testing operations with.

The handset is offered up to a wheel nut on the identified wheel and, again by means of the key pad, the test operation is commenced and the relevant LED indicates by light pulses the length of time during which the device is to be held in position with spacer device 22 over the relevant wheel nut in order to generate the appropriate braking test data.

It is to be understood that a test of this kind is carried out after the vehicle has executed a generally standardised braking test run incorporating an approximately standardised brake application, for example braking the vehicle to rest from a defined road speed. It is not material that such a test will not be carried out totally accurately by any given operator. All that is required is the generation of sufficient heat energy within the braking system in order for the infra-red spot sensor to be able to carry out its sensing function.

An important aspect of the operational characteristics of the brake analysis function concerns the sequence of tests to be carried out. Thus, display device 28 is caused to generate instructions for the user, displayed by means of the LED devices 40, 42, whereby the user carries out a defined sequence of testing steps, moving from one wheel to the next, either on the same side of the vehicle or between opposite sides, or both, in the relevant sequence according to the desired test characteristics, and as indicated by the relevant LEDs in sequence.

A particular aspect of the sequence of testing steps in this embodiment is that these involve a repetition of at least one step in the sequence whereby allowance made for the effect of the time taken to carry out the sequence of steps can be is checked and adjusted if necessary. This function is carried out by means of the system processor (see item 28 in FIG. 4 of EP '018), and this function may be provided within handset 14, or within the base station with which it communicates via the infrared link 16.

Amongst other modifications which could be made within the above embodiment while remaining within the scope of the invention defined by the claims are the following:

a) modification of the general format of display device 28 whereby the test functions may be indicated in alternative ways, including the use of text or graphic functions instead of or in addition to the LED devices, these latter being particularly suitable for use in low light conditions which may be experienced when testing within the heavily dished structures of dual wheel assemblies in trucks and like vehicles. One particularly practical modification is the use of LED bar graphs for indicating the results of a twostep test, such providing a direct and instantly readable indication of the test result;

b) modification of the general structure and dimensions of mechanical locater device 22 to meet the particular requirements of vehicles or infra-red sensor devices or the use of a non-mechanical system eg a laser-spot-pointer system utilising a self-focusing infrared thermal sensor instead of the fixed-focus system usable with locator 22;

c) modification of the input arrangements for vehicle type or vehicle braking or wheel system characteristics. It would of course be entirely possible and sometimes convenient to provide these facilities on the handset, and would necessarily be so if a base station were not employed;

d) while a wireless (such as infrared) communications link has been indicated, of course a cable link may be readily provided between the handset and the base station;

e) considerable variation in the design of the handset 14 may be made with a view to maximising operator convenience and minimising size and weight; and f) it is envisaged that extreme practical functionality may be achievable in terms of simple brake or tire or other equipment sensing by means of a simple handset device incorporating a mechanical locator device thereby enabling the use of fixed-focus infrared thermal sensing and with a software provision based upon the mere comparison of two (rather than a long sequence of tests) wheels (or other assemblies to be tested). In this simple system, the handset itself does not require a base station and neither does it require the generation of operating instructions other than a minimum of indication as to the commencement and/or completion of one or other of the test steps. Such a system would merely require the handset to be applied, for example, to a wheel nut, and the on/off button to be actuated, and the handset to be maintained in position for a stated time interval of (say) 10 or 15 or 20 seconds, followed by transference of the handset to a wheel nut on the other wheel to be tested, such transference to be effected in a time not longer than (say) 30 seconds, followed by a similar testing step on the second wheel, following which the handset would immediately calculate any imbalance and indicate same. Such a system would provide great utility and practical applicability.

g) While the described embodiments have been principally concerned with the detection of thermal differences in nominally thermally balanced systems, the invention is also applicable to systems in which known or measurable temperature differences exist in thermal (or thermal difference) equilibrium. In such situations the apparatus may be provided with thermal data on the temperature difference to be expected and when the apparatus is used in that situation (identified possibly merely by means of a labelled function choice button) the system compares the sensed temperatures with those which should be present and indicates the result accordingly. An example of such an application is temperature difference between portions of the exhaust or muffler system of a vehicle, in which the apparatus is used to monitor correct operation of the catalytic system by reference to the temperature differences which it generates.

What is claimed is:

1. A method for analysis of brake performance in automotive vehicles comprising:
   a) providing sensing means including infra-red spot sensor means and causing same to sense the temperature of a location on a brake structure; and
   b) comparing data from at least two such brake structure sensing steps to determine the degree of brake imbalance present;
   charactised by
   c) inputting data to said sensing means or to a test control system associated therewith relating to vehicle type or wheel or brake structure characteristics;
   d) providing said sensing means with a mobile testing handset and causing said handset to generate testing instructions in accordance with the method to be carried out for a given structure under test;
   e) carrying out testing steps on at least two brake structures of at least one axle of said vehicle by means of said handset in accordance with said instructions displayed by said handset and thereby generating test data relating to said brake performance; and
   f) said testing steps being carried out in a sequence defined and in accordance with said instructions and including a repetition of at least one step of said sequence whereby allowance made for the effect of the time taken to carry out said sequence of steps can be checked and adjusted if necessary.

2. Apparatus for analysis of brake performance in automotive vehicles, comprising:
   a) sensing means including infra-red spot sensor means adapted to sense the temperature of a location on a brake structure connected thereto;
   b) comparator means adapted to compare data from at least two such brake structure sensing steps to determine the degree of braking imbalance;
   characterised by
   c) data input means adapted to permit the inputting of data to said sensing means or to a test control system associated therewith relating to vehicle type or wheel or brake structure characteristics;
   d) said sensing means comprising a mobile testing handset adapted to generate testing instructions in accordance with the method to be carried out for a given vehicle type or wheel or brake structure characteristics under test;
   e) said handset being adapted to generate said testing instructions for said sensing steps and defining a sequence of steps and including a repetition of at least one step of said sequence whereby allowance made for the effect of time taken to carry out said sequence of steps can be checked and adjusted if necessary.

3. A method of analysis of thermal distribution in a vehicle system comprising heat generating means, the method comprising:
   a) causing a vehicle to execute an amount of thermal distribution in relation to at least a pair of assemblies or components or systems to be tested to provide an opportunity to generate at least a minimum quantum of heat for test purposes;

b) providing thermal sensor means and causing same to sense the temperature of a first such assembly or component or system;

c) taking said sensor means to a second such assembly or component or system which normally constitutes with said first such assembly or component or system a thermally related pair, and causing said thermal sensor means to sense the temperature of said second assembly or component or system;

d) providing thermal comparator means adapted to compare the temperatures of said assemblies or components or systems and adapted to indicate the state of thermal balance or imbalance or thermal relationship thereof and causing same to effect such comparison and indication in relation to said first and second assemblies or components or systems;

characterised by e) providing said sensor means as part of a mobile handset adapted to be hand-held by a user at a location close to or adjacent each such assembly or component or system to be tested;

f) providing said handset with its own locator means operative in relation to said thermal sensor means to enable the user rapidly to position same in relation to said assemblies or components to be tested so as to provide a valid comparison basis between said temperature sensing steps.

4. A method according to any one of claim 1 or 3 characterised by said handset having a communications link to a data handling system and said method comprising sensing test data at said handset and transmitting same to said data handling system through said communications link.

5. A method according to claim 4 characterised by said communications link being established by locating said handset at a defined position with respect to said data handling system after sensing said test data.

6. A method according to any one of claim 1 or 5 characterised by carrying out said test steps with said handset at a distance from said vehicle wheels or other vehicle component defined by a location-and-distance-defining locator device.

7. A method according to claim 6 characterised by locating said locater device on a vehicle wheel nut or other vehicle projection or structure.

8. A method according to any one of claim 1 or 7 characterised by causing said handset to display said instructions at least in part by means of energy pulses.

9. A method according to claim 8 characterised by said energy pulses being of varying duration and/or colour/frequency.

10. A method according to claim 9 characterised by said light pulses being displayed in a device representing one or more aspects of the construction of the vehicle wheels or braking system so as to indicate the location at which a test is to be made.

11. Apparatus for effecting analysis of thermal distribution in a vehicle system comprising heat generating means, the apparatus comprising:

a) thermal sensor means adapted to sense the temperature of a first assembly or component or system to be tested after a vehicle incorporating same has executed an amount of thermal distribution so as to provide an opportunity for generation of at least a minimum quantum of heat for test purposes;

b) said sensor means being likewise adapted to sense in relation to a second such assembly or component or system which normally constitutes with said first such assembly or component or system a thermally balanced or related pair, whereby said thermal sensor means can sense the temperature of said second such assembly or component;

c) thermal comparator means adapted to compare the temperatures of said assemblies or components and adapted also to indicate the state of thermal balance or imbalance or relationship;

characterised by d) said sensor means being provided as part of a mobile handset adapted to be handheld by a user at a location close to or adjacent each such assembly or component or system to be tested;

e) said handset comprising its own locator means operative in relation to said thermal sensor means to enable the user rapidly to position same in relation to said assemblies or components or systems to be tested so as to provide a valid comparison basis between said temperature sensing steps.

12. Apparatus according to any one of claim 2 or 11 characterised by said handset having a communications link to a data handling system or base station, and said handset being adapted to sense test data and to transmit same to said base station through said communication link.

13. Apparatus according to claim 12 characterised by said communications link being adapted to be established by locating said handset at a defined position with respect to said data handling system or base station after sensing said data.

14. Apparatus according to any one of claim 2 or 13 characterised by a locater device adapted to define a test location and distance for said handset from said vehicle wheels.

15. Apparatus according to claim 14 characterised by said locater device being adapted to be located on a wheel nut or other vehicle component or projection on said vehicle wheel.

16. Apparatus according to any one of claim 2 or 15 characterised by said handset being adapted to display said instructions at least in part by means of energy pulses.

17. Apparatus according to claim 16 characterised by said light pulses being of varying duration and/or colour.

18. Apparatus according to claim 17 characterised by said light pulses being displayed in a device representing one or more aspects of the construction of a vehicle's wheels or braking system so as to indicate the location at which a test is to be made.

* * * * *